(12) United States Patent
Staelin (10) Patent No.: US 8,081,830 B2
(45) Date of Patent: Dec. 20, 2011

(54) ENHANCEMENT OF DIGITAL IMAGES

(75) Inventor: Carl Staelin, Haifa (IL)

(73) Assignee: Hewlett-Packard Development Company, L.P., Houston, TX (US)

(*) Notice: Subject to any disclaimer, the term of this patent is extended or adjusted under 35 U.S.C. 154(b) by 1601 days.

(21) Appl. No.: 11/032,865

(22) Filed: Jan. 11, 2005

(65) Prior Publication Data

US 2006/0153467 A1    Jul. 13, 2006

(51) Int. Cl.
*G06K 9/46* (2006.01)
(52) U.S. Cl. .................................... 382/248; 382/250
(58) Field of Classification Search .............. 382/248, 382/250, 254, 268; 375/240.18, 240.2
See application file for complete search history.

(56) References Cited

U.S. PATENT DOCUMENTS 3,902,008 A * 8/1975 Ogawa .................. 358/426.01
4,791,598 A * 12/1988 Liou et al. .................. 708/402
5,126,962 A * 6/1992 Chiang ........................ 708/401
7,366,238 B2 * 4/2008 Zeng et al. ............... 375/240.18
2001/0026642 A1 * 10/2001 Kang et al. .................... 382/248

OTHER PUBLICATIONS

A. Nosratinia, "Enhancement of jpeg-compressed images by reapplicationof jpeg," Journal of VLSI Signal Procesing Systems for Signal,Image, and Video Technology, vol. 27, pp. 69-79, Feb. 2001.
R.R. Coifman and D.L. Donoho, "Translation invariant denoising," inWavelets and Statistics. Lecture Notes in Statistics. 1995, pp. 125-150,Springer-Verlag.

* cited by examiner

*Primary Examiner* — Brian Le

(57) ABSTRACT

Processing of at least one digital image includes performing first and second separable block transforms in first and second directions; modifying results of the second block transforms; and performing first and second separable inverse block transforms in the first and second directions on the modified results. Transform coefficients are re-used while performing at least one the transforms. The processing can be performed on 2-D signals such as still images and 3-D signals such as video.

35 Claims, 6 Drawing Sheets

ENHANCEMENT OF DIGITAL IMAGES

BACKGROUND

JPEG is a standardized image compression algorithm. Traditional JPEG compression of an image includes dividing the image into a grid of non-overlapping 8×8 blocks of pixels, and independently coding each pixel block. The coding of each pixel block includes taking a two-dimensional Discrete Cosine Transform (DCT) to obtain an 8×8 block of DCT coefficients; and quantizing the DCT coefficients. The quantization exploits the following: the low frequency DCT coefficients contain most of the image energy; sensitivity limits of the human visual system vary with spatial frequency (e.g., small high-frequency changes are perceived less accurately than small low-frequency changes); and the human visual system is much more sensitive to high frequency variations in luminance than similar variations in color.

The image may be reconstructed by performing an inverse DCT transform on the quantized coefficients. Because the coefficients are quantized, the reconstructed image does not contain all of the information of the original image.

The reconstructed image can contain artifacts that were not present in the original image. Background texture in the original image may appear as blocks of different shades in the reconstructed image, since each DCT block may be smoothed to a single shade in the reconstructed image. The smoothed blocks are visible in the reconstructed image, and they create new edges and lines in the reconstructed image. These smoothed blocks, and new lines and edges are sometimes referred to as "blocking" artifacts. In addition, edges that are crisp in the original image might have echoes or shadows in the reconstructed image. These echoes and shadows are sometimes referred to as "ringing" artifacts.

The blocking and ringing artifacts can degrade image quality. These artifacts may be especially prominent if the JPEG compression was performed at a low bit rate (i.e., a high compression).

The following method can be used to reduce the visibility of these artifacts in an image that has already been compressed according to the JPEG standard and then reconstructed. The digital image is shifted in horizontal and vertical directions by (i,j). A blocked DCT similar to that used in traditional JPEG is applied to the shifted image to produce DCT coefficients, the DCT coefficients are modified, using for example the original quantization method and table of the original image, an inverse DCT is applied on the modified transform coefficients to produce a reconstructed image, and the reconstructed image is shifted back in the horizontal and vertical directions by (−i,−j). Assuming 8×8 blocked DCT, the JPEG image is shifted by other amounts in the range [−3, ..., 4]×[−3, ..., 4]. On each shifted image, a blocked 8×8 DCT and inverse DCT are performed. All reconstructed images are averaged.

One problem with this method is that it is computationally intensive. A total of sixteen 1×8 DCT transforms are performed to transform each image from the spatial domain to the frequency domain, and another sixteen 1×8 DCT transforms are performed to transform blocks from the frequency domain back to the spatial domain Each transform is computationally intensive, placing a heavy computational burden on the image processor. The computational burden is equally as heavy during image reconstruction.

It would be desirable to reduce the computational burden of this method. Reducing the computational burden would reduce the cost of artifact reduction, and it could increase the range of applications for the method.

SUMMARY

According to one aspect of the present invention, enhancing a digital image includes transforming the digital image from a spatial domain representation to a frequency domain representation; modifying the frequency domain representation; and transforming the modified frequency domain representation back to a spatial domain representation. Transform coefficients are re-used during at least one the transformations.

According to another aspect of the present invention, processing of at least one digital image includes performing first and second separable block transforms in first and second directions; modifying results of the second block transforms; and performing first and second separable inverse block transforms in the first and second directions on the modified results. Transform coefficients are re-used while performing at least one the transforms.

Other aspects and advantages of the present invention will become apparent from the following detailed description, taken in conjunction with the accompanying drawings, illustrating by way of example the principles of the present invention.

DETAILED DESCRIPTION

As shown in the drawings for purposes of illustration, the present invention is embodied in a method of enhancing a digital image, the image having already been compressed by JPEG or another N-dimensional separable block transform, and then reconstructed. As a first instance of using the method, the visibility of JPEG artifacts are reduced in a digital image that was reconstructed from a JPEG bit stream. As a second instance of using the method, noise in a video stream is reduced. During the image enhancement, transform coefficients are re-used. Re-use of the transform coefficients reduces the computational burden of the image enhancement.

Figure 1:
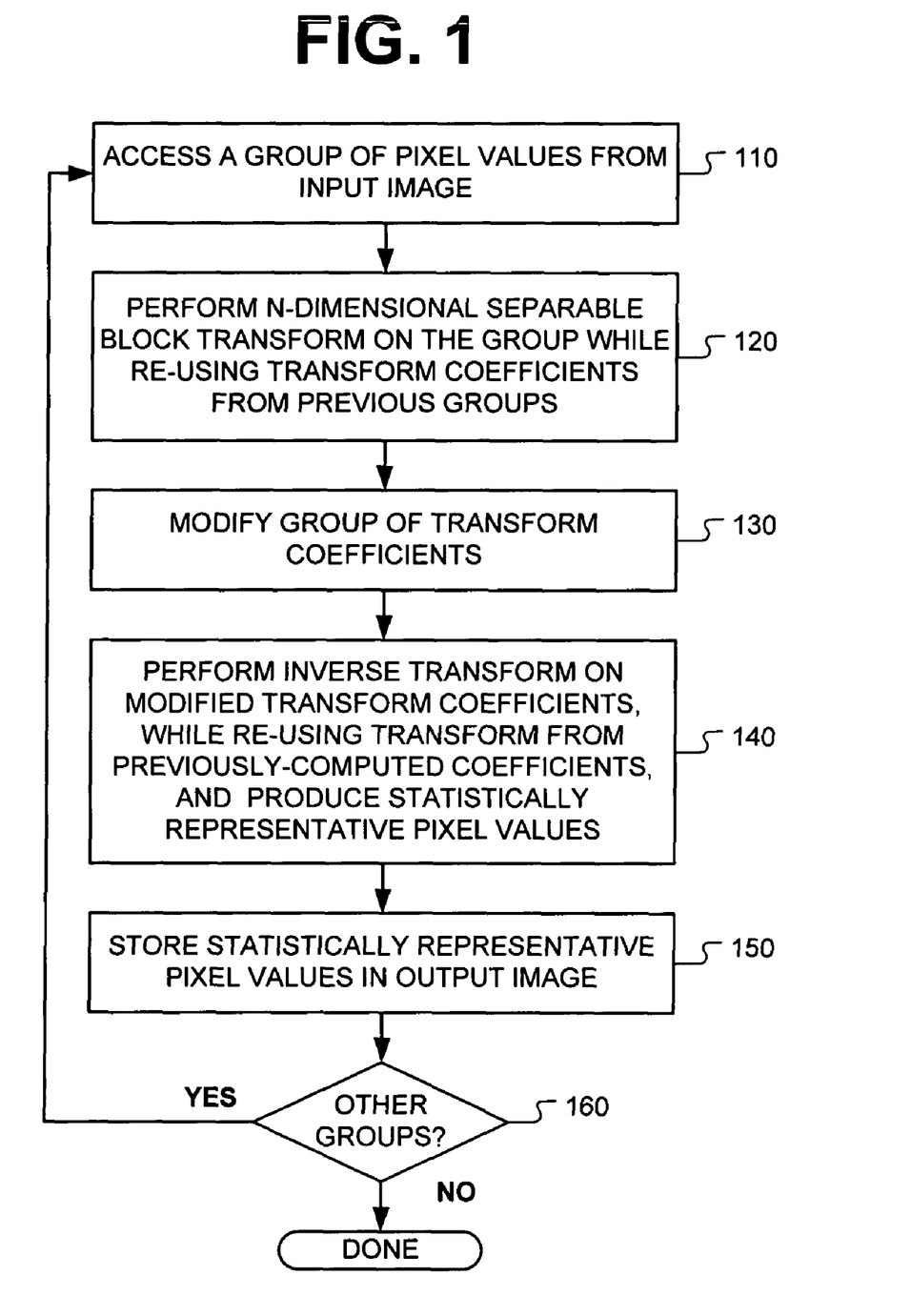
FIG. 1 is an illustration of a method of processing a digital image in accordance with an embodiment of the present invention.

Reference is made to FIG. 1, which illustrates a method of enhancing an input digital image. The input image is represented in the spatial domain by an array of n-bit words. Each n-bit word describes a pixel of the input image.

The input image may be processed one channel at a time. Steps 110-160 may be performed on one or more channels of the input image. As a first example, the input image is converted from its original color space to luminance-chrominance space, steps 110-160 are performed on the luminance channel to produce an output image, and then the output image is converted back to the original color space. As a second example, the input image is processed in its original RGB color space, and steps 110-160 are performed on each of the red, green and blue channels, one channel at a time.

During step 110, a group of pixel values are accessed from the input image. During step 120, block transforms are performed on the group of pixel values, while re-using transform coefficients generated from previous transforms. A separable block transform is used. During step 130, the resulting transform coefficients are modified to achieve a processing goal, such as denoising. During step 140, inverse block transforms are performed on the modified transform coefficients, while re-using coefficients that were computed during previous inverse transforms. The inverse transforms performed during step 140 are used to produce statistically representative (e.g., average) pixel values, which are stored in an output image (step 150). Other groups of pixels in the input image may be processed in the same manner (step 160).

Figure 2A:
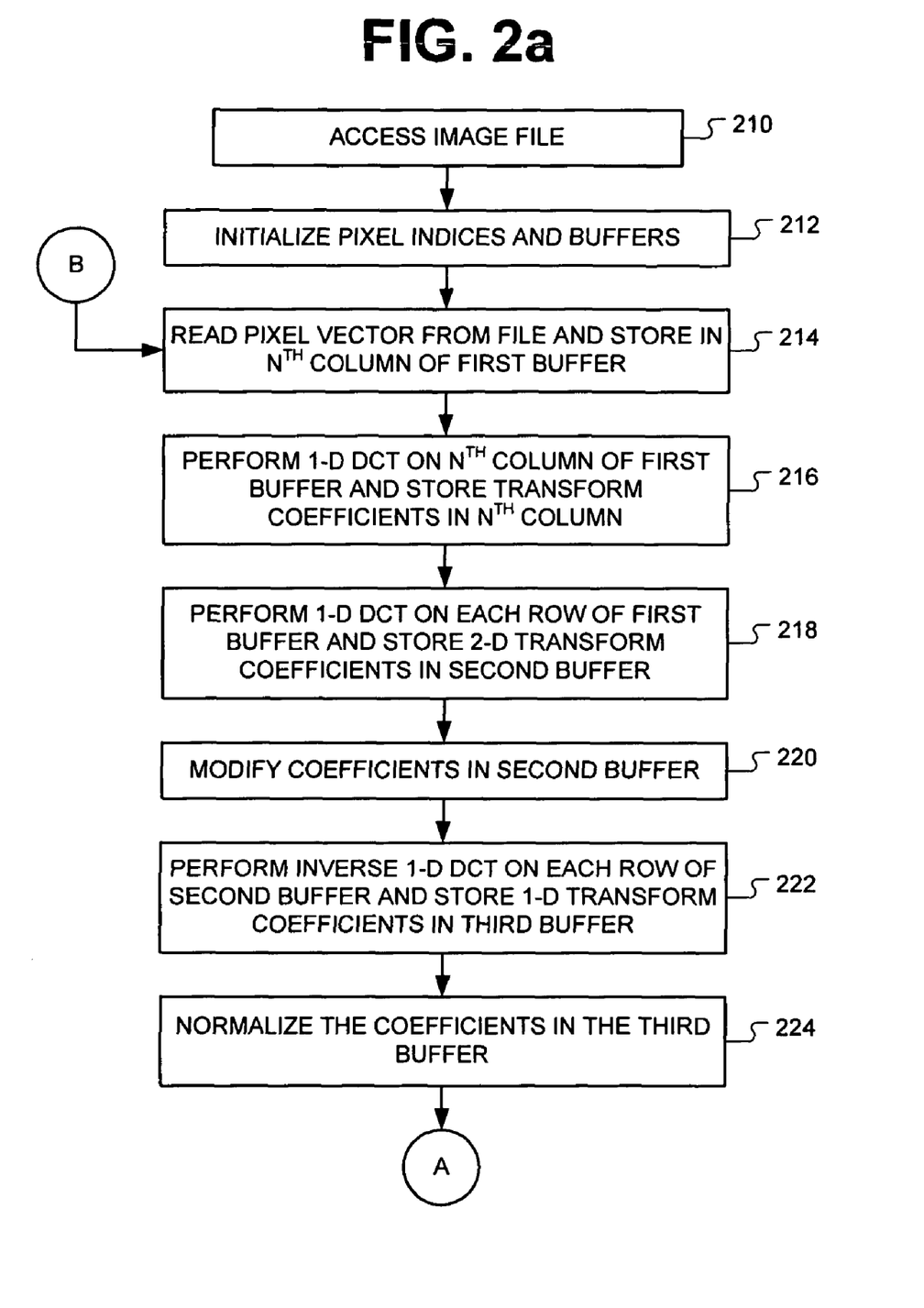
FIGS. 2a and 2b illustrate of a method of processing a digital image in accordance with an embodiment of the present invention.
Figure 2B:
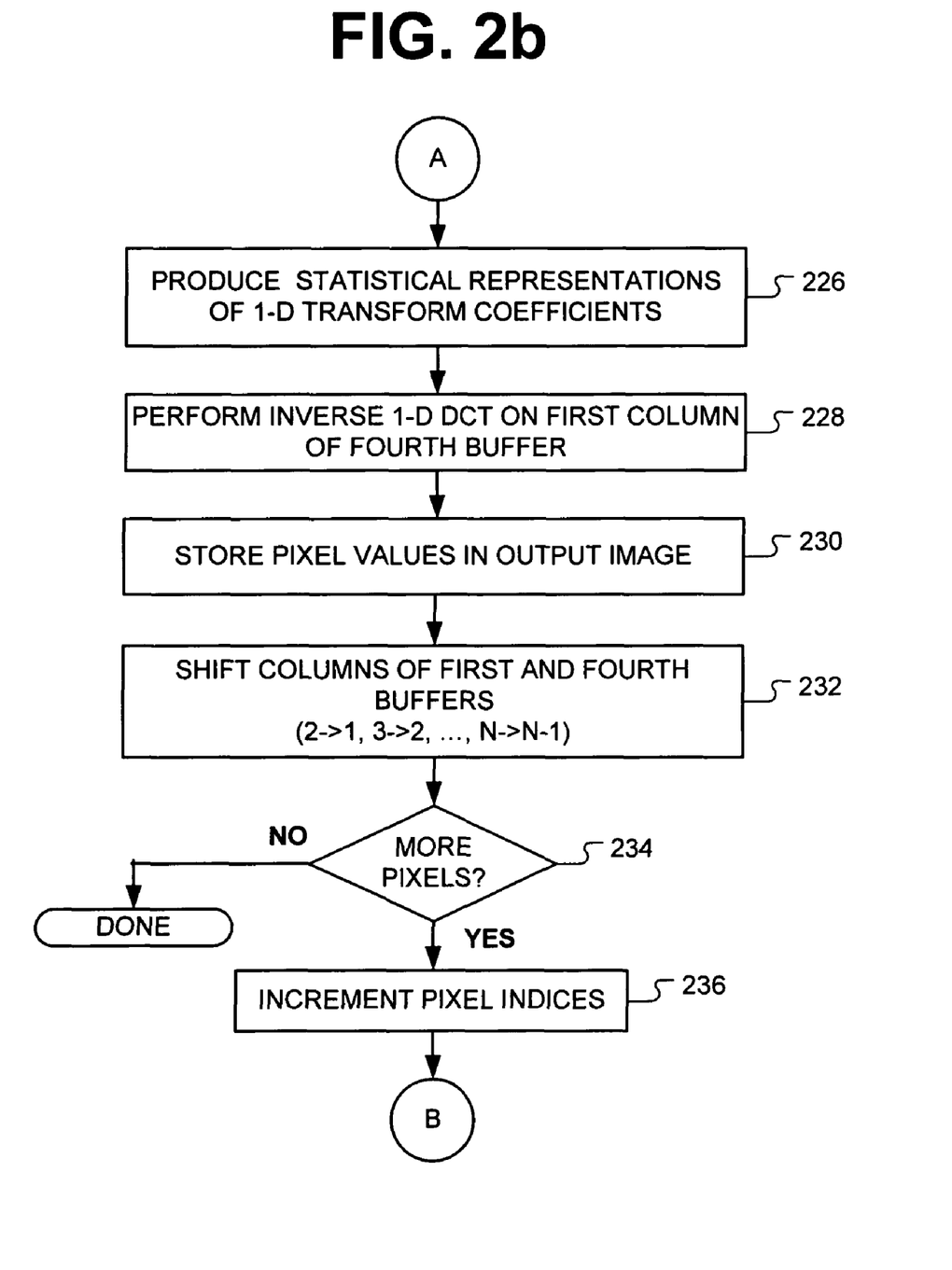

Reference is now made to FIGS. 2a and 2b, which illustrate a specific example of enhancing a digital image that was reconstructed from a JPEG bit stream. In the example, the transform is a 2-D DCT, and block size is M×N. The method uses four M×N buffers. The M×N buffer size allows the four buffers to be independent of image size. Transform coefficients will be re-used in the first and fourth buffers.

During step 210, an image file is accessed. The image is already in the appropriate color space. The image is processed one color plane at a time. The following steps are performed on each color plane.

During step 212, pixel indices (k,j) and the four buffers are initialized. For example, the pixel indices (k,j) are set to the first pixel in the image file (e.g., k=1, j=1) and entries in the four buffers are set to zero.

During step 214, a column vector of M pixels is read from the image file, and the column vector is stored in the $N^{th}$ (last) column of the first buffer. Thus pixels $P_{kj}$ to $P_{kj+M-1}$ are stored in the $N^{th}$ column of the first buffer.

During step 216 an M×1 DCT is performed on the $N^{th}$ column of the first buffer. As a result, the M pixels in the $N^{th}$ column are transformed into 1-D transform coefficients.

During step 218, a 1×N DCT transform is performed on each row of the first buffer. These M transforms may be performed in parallel. The resulting M×N 2-D DCT coefficients are stored in the second buffer.

During step 220, the M×N transform coefficients in the second buffer are modified. The transform coefficients are modified according to image processing goals. As a first example, image denoising may be performed by quantizing the 2-D DCT coefficients. Quantization rounds off the 2-D DCT coefficients to zero and non-zero values.

As a second example, image denoising may be performed by performing soft thresholding on the 2-D DCT coefficients. In soft thresholding the coefficients may be transformed as follows:

$$f(v) = \begin{cases} v+t & \text{for } (v \le -t) \\ v-t & \text{for } (t < v) \\ 0 & \text{otherwise} \end{cases}$$

where v is the original coefficient value, t is a threshold, and f(v) is the modified coefficient. This modification results in smoothing (denoising). A lookup table (LUT) may be used to perform the modifications. Other types of processing (e.g., selective smoothing and sharpening) may be performed as well during step 220.

The modified coefficients are then transformed back to the spatial domain. During step 222, a 1×N inverse DCT is performed on each row of the second buffer. The resulting N rows of M×1 1-D transform coefficients are stored in the third buffer.

During step 224, the 1-D transform coefficients in the third buffer are normalized. For example, each coefficient is divided by N, which is the total number times that the fourth buffer will be shifted in order to output a single column of pixel values.

During step 226, the contents of the third buffer are combined with the contents of the fourth buffer. As a result, the coefficients in the first column of the fourth buffer are statistical representations of the 1-D transform coefficients. For example, the contents of the third and fourth buffers may be summed. Each coefficient in the first column represents an average value. Each coefficient in the other columns represents partial averages (each coefficient in the second column represents N-1 summations, while each coefficient in the last column represents a single summation).

During step 228, an M×1 inverse DCT is performed on the first column of the fourth buffer. Resulting is a column vector of pixel values.

During step 230, the pixel values in the column vector are stored at corresponding locations in an output image.

Before the next group of pixels is read from the image file, the first and fourth buffers are shifted left by one column (step 232). In the process, the first column of the first buffer is shifted off, the second column is shifted to the first column, the third column is shifted to the second column, and so on. The last column is vacated. Similarly, the first column of the fourth buffer is shifted off, second column is shifted to the first column and so on, and the last column is vacated. The vacated columns may be initialized (e.g., filled with zeros). This will allow the transform coefficients to be re-used during processing of subsequent lines of the image.

To process additional groups of pixels (step 234), the pixel indices are incremented (step 236). For example, the indices would be k=1 and j=j+M for another column of pixels. Control is returned to step 214, where the next vector of M pixels is read and stored in the $N^{th}$ column of the first buffer.

An example of the method of FIGS. 2a-2b is provided in the following tables. In the example, 8×8 processing is performed. The following tables and corresponding paragraphs describe the processing of a single 8×8 block.

Table 1 lists the pixels in the input image. The subscripts indicate row and column number. Thus, pixel $P_{13}$ lies in the first row and third column of the input image. The pixels being processed are underlined.

TABLE 1

| $P_{11}$ | $P_{12}$ | $P_{13}$ | $P_{14}$ | $P_{15}$ | $P_{16}$ | $P_{17}$ | $P_{18}$ | $P_{19}$ | ... |
| $P_{21}$ | $P_{22}$ | $P_{23}$ | $P_{24}$ | $P_{25}$ | $P_{26}$ | $P_{27}$ | $P_{28}$ | $P_{29}$ | ... |
| $P_{31}$ | ... | | | | | | | | |
| . | | | | | | | | | |
| . | | | | | | | | | |
| . | | | | | | | | | |

Table 2 describes the first buffer after eight pixels ($P_{18}$ to $P_{88}$) have been added to the $N^{th}$ column. The remaining entries in the buffer are occupied by 1-D transform coefficients (which were previously processed). For example, transform coefficient $D_{11y}$ represents the 1-D transform in the y-direction of pixel $P_{11}$. Table 3 describes the first buffer after an 8×1 DCT has been performed on pixels $P_{18}$ to $P_{88}$.

TABLE 2

| $D_{11y}$ | $D_{12y}$ | ... | $D_{17y}$ | $P_{18}$ |
| $D_{21y}$ | $D_{22y}$ | ... | $D_{27y}$ | $P_{28}$ |
| $D_{31y}$ | $D_{32y}$ | ... | $D_{37y}$ | $P_{38}$ |
| . | . | | . | . |
| . | . | | . | . |

TABLE 3

| $D_{11y}$ | $D_{12y}$ | ... | $D_{17y}$ | $D_{18y}$ |
|---|---|---|---|---|
| $D_{21y}$ | $D_{22y}$ | ... | $D_{27y}$ | $D_{28y}$ |
| $D_{31y}$ | $D_{32y}$ | ... | $D_{37y}$ | $D_{38y}$ |
| . | . | | . | . |
| . | . | | . | . |
| . | . | | . | . |

Next eight 1×8 DCTs are performed on the eight rows, and the resulting 2-D transform coefficients are stored in the second buffer. The coefficients in the second buffer are then modified. Table 4 describes the second buffer before the 2-D transform coefficients are modified, and Table 5 describes the second buffer after the 2-D transform coefficients have been modified.

TABLE 4

| $D_{11xy}$ | $D_{12xy}$ | ... | $D_{17xy}$ | $D_{18xy}$ |
|---|---|---|---|---|
| $D_{21xy}$ | $D_{22xy}$ | ... | $D_{27xy}$ | $D_{28xy}$ |
| $D_{31xy}$ | $D_{32xy}$ | ... | $D_{37xy}$ | $D_{38xy}$ |
| . | . | | . | . |
| . | . | | . | . |
| . | . | | . | . |

TABLE 5

| $D'_{11xy}$ | $D'_{12xy}$ | ... | $D'_{17xy}$ | $D'_{18xy}$ |
|---|---|---|---|---|
| $D'_{21xy}$ | $D'_{22xy}$ | ... | $D'_{27xy}$ | $D'_{28xy}$ |
| $D'_{31xy}$ | $D'_{32xy}$ | ... | $D'_{37xy}$ | $D'_{38xy}$ |
| . | . | | . | . |
| . | . | | . | . |
| . | . | | . | . |

Eight 1×8 inverse DCTs are performed on the eight rows of modified transform coefficients, and the resulting 1-D transform coefficients are stored in the third buffer. Each coefficient in the third buffer is divided by the total number of shifts used. This is done to normalize the coefficients. For example, each coefficient in the third buffer is divided by the number of pixels used in the summation. Table 6 describes the third buffer before coefficient normalization.

TABLE 6

| $D'_{11y}$ | $D'_{12y}$ | ... | $D'_{17y}$ | $D'_{18y}$ |
|---|---|---|---|---|
| $D'_{21y}$ | $D'_{22y}$ | ... | $D'_{27y}$ | $D'_{28y}$ |
| $D'_{31y}$ | $D'_{32y}$ | ... | $D'_{37y}$ | $D'_{38y}$ |
| . | . | | . | . |
| . | . | | . | . |
| . | . | | . | . |

TABLE 7

| $S_{11y}$ | $S_{12y}$ | ... | $S_{17y}$ | $S_{18y}$ |
|---|---|---|---|---|
| $S_{21y}$ | $S_{22y}$ | ... | $S_{27y}$ | $S_{28y}$ |
| $S_{31y}$ | $S_{32y}$ | ... | $S_{37y}$ | $S_{38y}$ |
| . | . | | . | . |
| . | . | | . | . |
| . | . | | . | . |

The contents of the third buffer are summed with the contents of the fourth buffer. Thus, $S_{ij_y} = S_{ij_y} + D''_{ij_y}$, where $D''_{ij_y}$ represents a normalized coefficient in the third buffer. Table 7 describes the fourth buffer. The values of the coefficients in the first column of the fourth buffer result from N summations of normalized coefficients (e.g., $\{S_{ij}(n^{th}\ shift) + S_{ij}(n-1^{th}\ shift) + \ldots + S_{oj}(1^{st}\ shift)\}/N$. Thus, the coefficients in the first column are statistical representations (e.g., average values) of the 1-D transform coefficients. The values of the coefficients in the other columns are partial averages. For example, the coefficients $N^{th}$ column of the fourth buffer result from a single summation.

An 8×1 IDCT is performed on the leftmost (first) column of the fourth buffer. Table 8 describes the fourth buffer after the leftmost column has been transformed. The transformed column now contains pixel values ($I_{11}$ to $I_{81}$) in the spatial domain.

TABLE 8

| $I_{11}$ | $S_{12y}$ | ... | $S_{17y}$ | $S_{18y}$ |
|---|---|---|---|---|
| $I_{21}$ | $S_{22y}$ | ... | $S_{27y}$ | $S_{28y}$ |
| $I_{31}$ | $S_{32y}$ | ... | $S_{37y}$ | $S_{38y}$ |
| . | . | | . | . |
| . | . | | . | . |
| . | . | | . | . |

TABLE 9

| $O_{11} + I_{11}$ | $O_{12}$ | $O_{13}$ | $O_{14}$ | ... |
|---|---|---|---|---|
| $O_{21} + I_{21}$ | $O_{22}$ | $O_{23}$ | $O_{24}$ | ... |
| $O_{31} + I_{31}$ | $O_{32}$ | $O_{33}$ | $O_{34}$ | ... |
| . | . | . | . | |
| . | . | . | . | |
| . | . | . | . | |

The left column of the fourth buffer is summed with the corresponding pixels ($O_{ij}$) in the output image (at step 210 in FIGS. 2a-2b, the pixels in the output image may be set to $O_{ij}=0$). The output image is described in Table 9.

Preparation is made for processing the next block. The columns in the first and fourth buffers are shifted left, and the vacated columns are filled with zeros. Tables 10 and 11 describe the first and forth buffers after shifting.

TABLE 10

| $D_{12y}$ | $D_{13y}$ | ... | $D_{18y}$ | 0 |
|---|---|---|---|---|
| $D_{22y}$ | $D_{23y}$ | ... | $D_{28y}$ | 0 |
| $D_{32y}$ | $D_{33y}$ | ... | $D_{38y}$ | 0 |
| . | . | | . | |
| . | . | | . | |
| . | . | | . | |

TABLE 11

| $S_{12y}$ | $S_{13y}$ | ... | $S_{18y}$ | 0 |
|---|---|---|---|---|
| $S_{22y}$ | $S_{23y}$ | ... | $S_{28y}$ | 0 |
| $S_{32y}$ | $S_{33y}$ | ... | $S_{38y}$ | 0 |
| . | . | | . | |
| . | . | | . | |
| . | . | | . | |

The processing continues, as the next eight pixels ($P_{19}$ to $P_{89}$) are added to the $N^{th}$ column of the first buffer.

The method is not limited to the specific example in the tables above, nor is it limited to the illustration of FIGS. 2a-2b. Averages may be taken in ways other than normalizing the coefficients and then summing the normalized. For example, the sums may be taken and then divided by the number of shifts. Moreover, averages are not limited to equal weights. Weighted averages may be taken instead.

Instead of using averages, other criteria and statistics may be used. For example, median values might be computed as a more robust estimate of the correct value. However, computing the median values or other statistics might impact the normalization of the transform coefficients in the third buffer (step 224 of FIG. 2a). Computing the median values or other statistics might also impact the buffering. If, for example, the median values are computed, more state than one running sum would be maintained.

Rows and columns may be transposed, whereby transforms are performed on columns during the first stage, and the resulting DCT coefficients are re-used on the rows during the second stage.

Shifts may be made left instead of right, and up instead of down. Blocks may be square (e.g., 8×8, 16×16) but are not so limited.

Shifts of more than one pixel may be made. However the computational gain is reduced as the shift stride is increased, since the previously-generated intermediate results would be re-used fewer times.

Shifts need not be symmetric in the different dimensions. The shifting may be denser in the x-direction than in the y-direction. For example, the shifts may be made in a Quincunx pattern, where every other row and every other column are shifted. After an M×N block is processed, a shift of two pixels (instead of one pixel) is made. As a result, only one-quarter of the full 2-D transforms are performed, because a full transform is performed for every four pixels. However, the amount of work has not been reduced by a factor of four, since there has been a reduction in the reuse of the first set of 1-D coefficients.

A method according to the present invention is not limited to DCT transforms. Other separable transforms may be used. Separable transforms such as a 2-D Fast Fourier Transform (FFT) and a Discrete Sine Transform (DST) are similarly formed from the 1-D forms of the transforms.

There are a variety of ways to apply this method to color images, such as working on each color channel independently, transforming color spaces (e.g., RGB->YCC) and then working on each channel separately or only working on a subset of channels. If working in a luminance-chrominance space, the chrominance channels might be upsampled, depending on the original image. In JPEG, however, the chrominance channels might be downsampled with respect to the luminance channel. In other image formats the different channels might have the same resolution, whereby upsampling or downsampling would be not be performed.

A method according to the present invention is not limited to the processing of 2-D signals such as still images. The method may be extended to 3-D signals such as video.

To process video and other 3-D signals, an additional transform is taken in the temporal direction on a sequence of L frames. Additional shifting of the frames can be avoided, since each frame can be considered "temporally shifted" from its previous frame.

Figure 3:
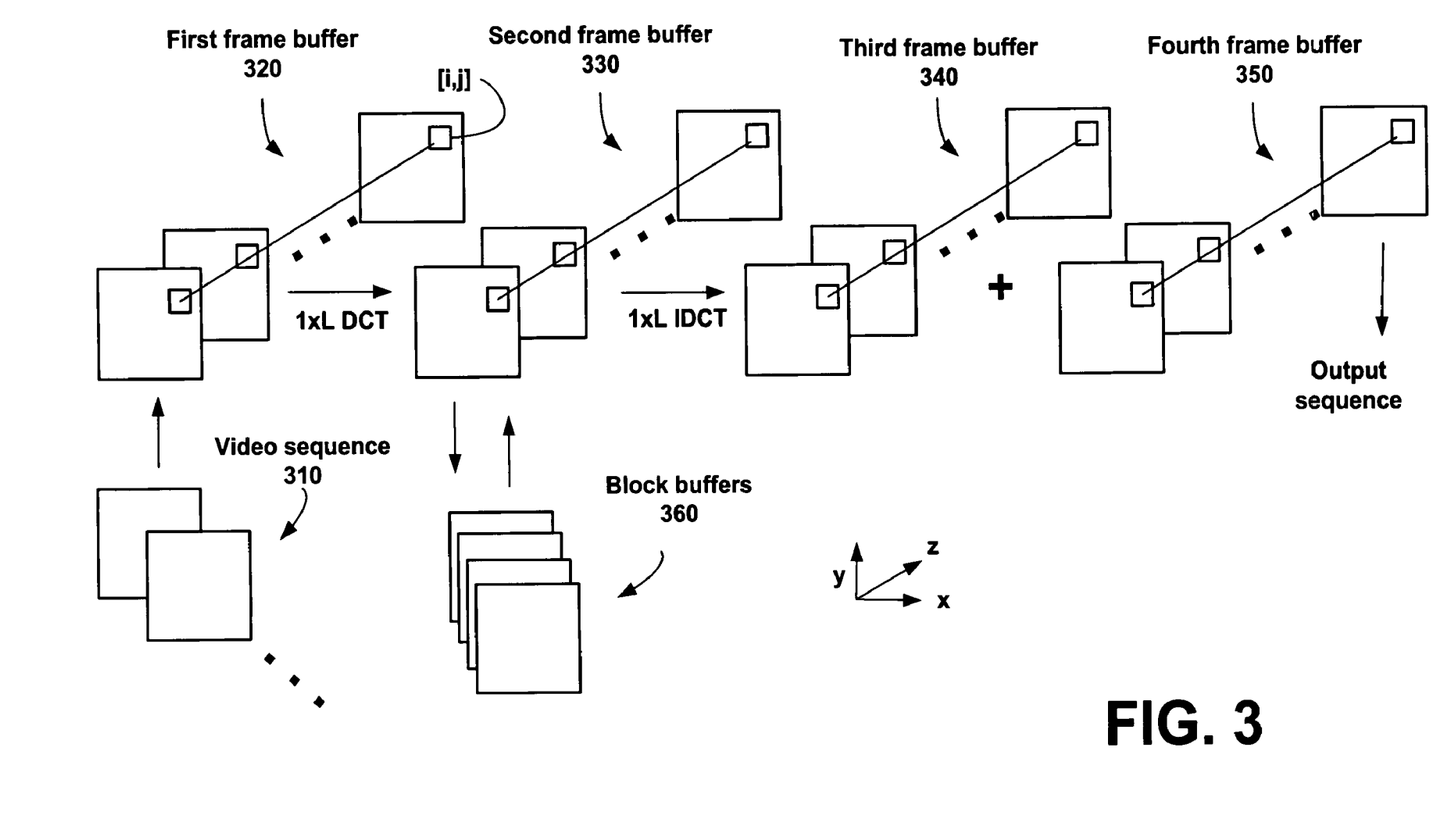
FIGS. 3-4 are illustrations of a method of processing a video stream in accordance with an embodiment of the present invention.
Figure 4:
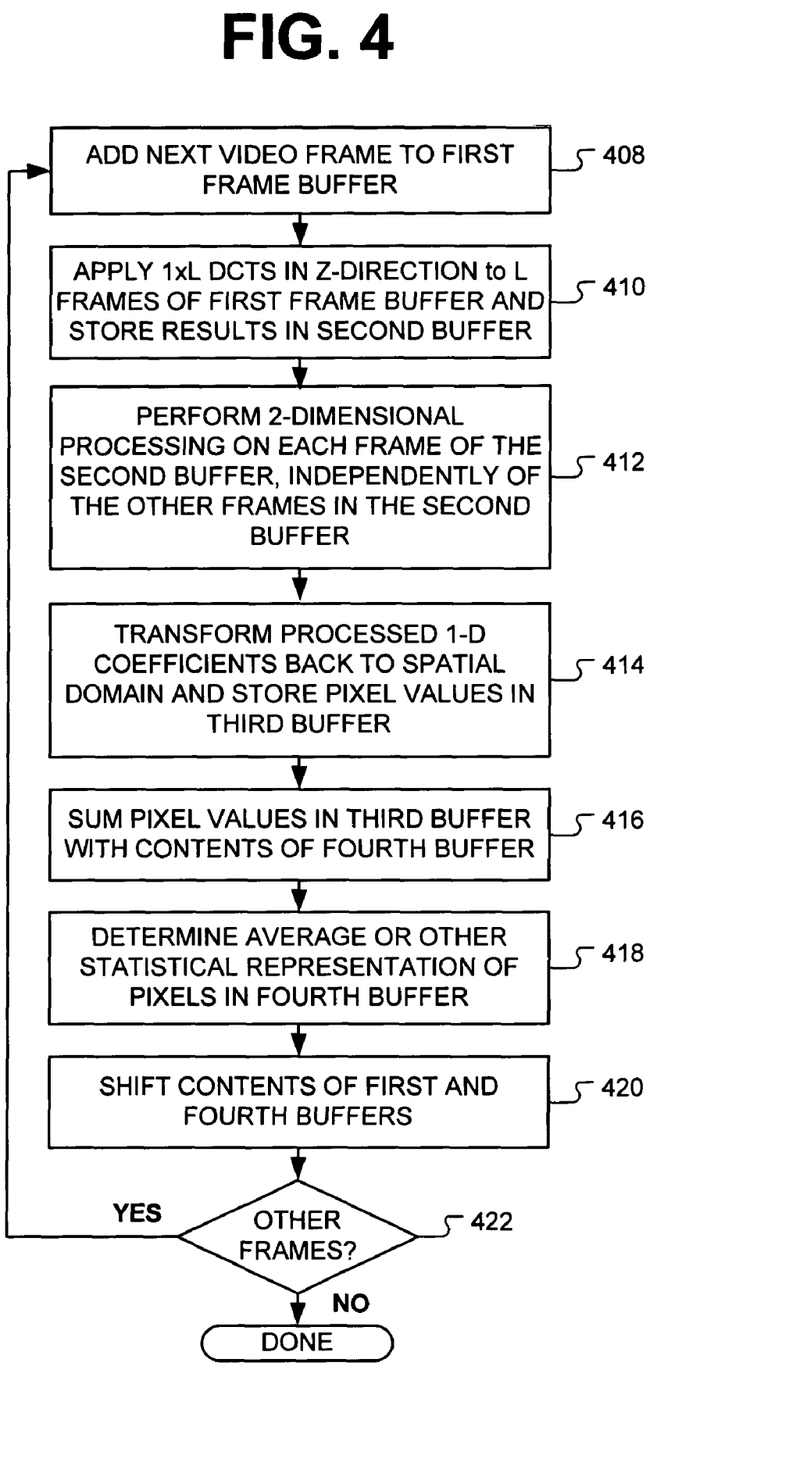

FIGS. 3-4 illustrate an example of processing a video signal. During the processing, four sets of frame buffers 320, 330, 340 and 350 are used. Each set of frame buffers 320, 330, 340 and 350 is organized as L planes of frames, where z=1 corresponds to the first frame, and z=L corresponds to the $L^{th}$ frame. During processing, four M×N block buffers 360 are also used. These block buffers 360 will be used for 2-D processing.

At step 408, the next frame in the video sequence 310 is shifted into the first frame of the first frame buffer 320.

At step 410, 1×L DCTs are applied to the first frame buffer 320. A 1×L DCT is applied in the z-direction to the same spatial location [i,j] in the first buffer frames (for example, the L pixels consisting of $P_{11}$ in the first frame to pixel $P_{11}$ in the $L^{th}$ frame of the first frame buffer 320). At the end of the processing in step 410, L frames of 1-D transform coefficients are stored in the second buffer 330.

At step 412, 2-D processing is performed on the transform coefficients in the second frame buffer 330. Each frame of the second frame buffer 330 is processed independently of the other frames in the second frame buffer 330. The 2-D processing is performed as follows. Transforms are performed in the y-direction to produce 2-D coefficients, and then transforms are performed in the x-direction to produce 3-D coefficients, The 3-D coefficients are modified, and then inverse transforms are performed in the x-direction and the y-direction. Using the four block buffers 360, transform coefficients are re-used during the transformations in the x and y directions. For example, the 2-D processing may be performed as shown in FIGS. 2a-2b. At the end of the processing in step 412, the resulting L frames of 1-D transform coefficients are stored in the second buffer 330.

At step 414, the 1-D transform coefficients in the second frame buffer 330 are transformed back to the spatial domain. For each location [i,j], a 1×L inverse DCT is performed in the z-direction. At the end of processing in step 414, L frames of pixel values are stored the third buffer 340. In the third buffer 340, the frames of pixel values are ordered in the z-direction, from the first frame (z=1) to the last frame (z=L).

At step 416, the pixel values in the third frame buffer 340 are summed with their corresponding values in a fourth frame buffer 350, and the results are stored in the fourth frame buffer 350. Thus, the fourth frame buffer stores a running sum of pixel values. The $L^{th}$ frame of the fourth buffer results from L summations, the L-$1^{th}$ frame in the fourth frame buffer 350 results from L-1 summations, and so on.

At step 418, each pixel value in the $L^{th}$ frame of the fourth frame buffer is divided by L to get an average value. Another statistical representation may be used instead.

At step 420, the first and fourth frame buffers are shifted forward (in a time sense) by one frame (e.g., frame 1->frame 2). The $L^{th}$ frame of the fourth frame buffer 350 is stored in an output sequence. The vacated (first) frame in the fourth buffer is set to zeros. If there are other frames in the sequence (step 422), the vacated frame in the first frame buffer is filled with the next frame in the video sequence 310 (step 408).

The coefficients in the temporal (z) direction are re-used because each 1×L transform is performed only once, and those coefficients are re-used by all of the 2-D transforms for all shifts. Although it is more efficient to re-use the coefficients resulting from the 1×L transforms, a method according to the present invention is not so limited. Instead, the video in the buffers may be processed as 8×8×8 blocks. For each 8×8×8 block, a separable transform may be performed independently, and a 1×L transform may be performed on each overlapping block. Transform re-use would occur only during the 2-D processing.

In the method of FIGS. 3-4, entire video frames are buffered and processed. However, a method according to the present invention is not so limited. Sliding window buffers could be used so that blocks of video frames are buffered instead of entire frames.

As with 2-D signals, shifts for 3-D signals need not be symmetric in the various dimensions. For video, the shifts are even more likely to be asymmetric. For example, the shifting might be dense (complete) in the time domain but sparse in the spatial (x,y) domain.

A method according to the present invention is not limited to any particular platform. Exemplary applications include personal computers and work stations, printers, digital cameras, scanners, and other machines that can process digital images. Since a method according to the present invention has a lower computation burden, it is especially attractive to digital cameras and other machines having limited memory and computational power.

Figure 5:
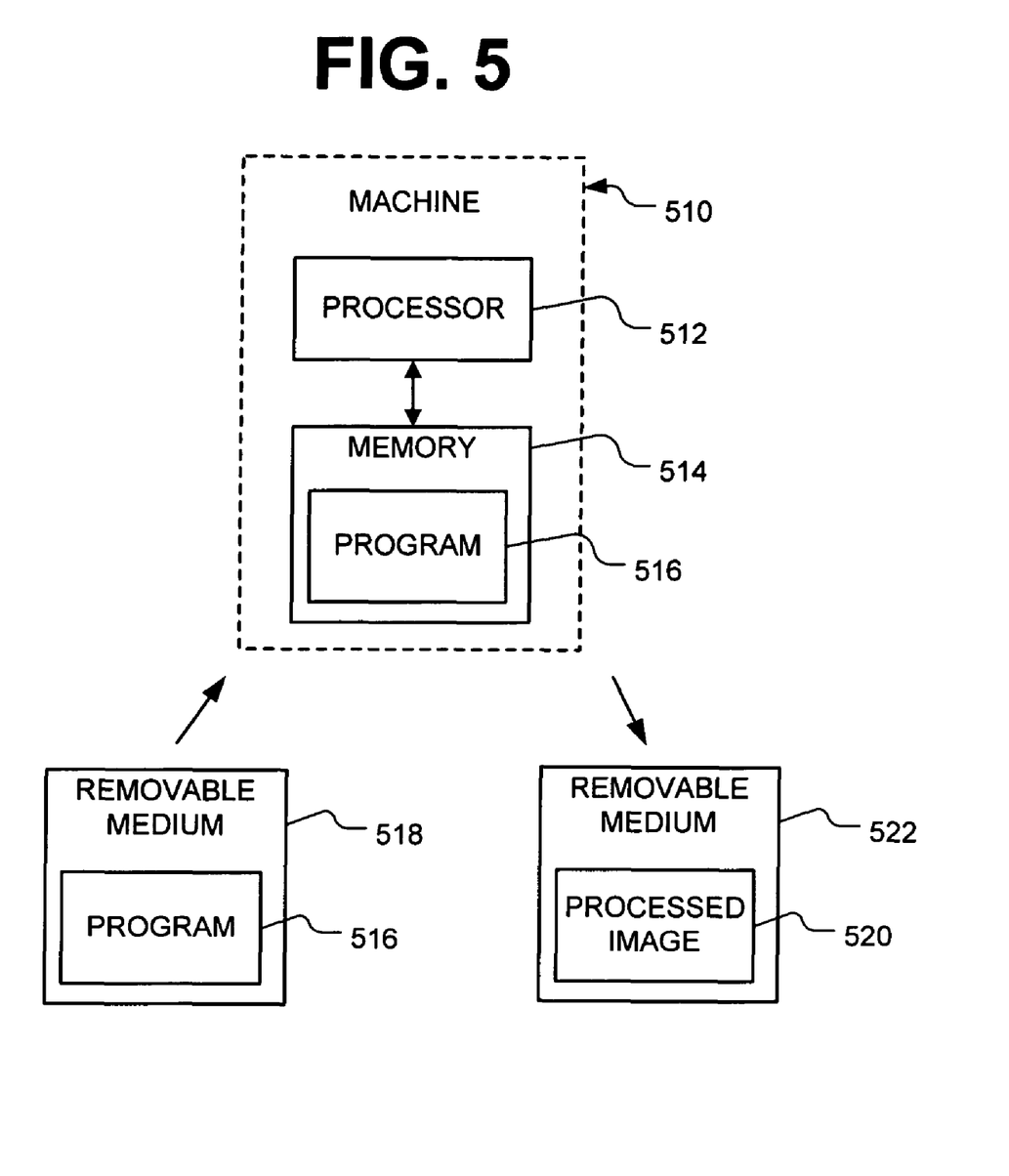
FIG. 5 is an illustration of an apparatus for processing a digital image in accordance with the present invention.

Reference is now made to FIG. 5, which shows an exemplary hardware implementation. A machine 510 includes a processor 512 and memory 514. The memory 514 stores a program 516 that, when executed, causes the processor 512 to process a digital image according to the present invention. The processor 512 and memory 514 could be resident in a personal computer. In the alternative, the processor 512 and memory 514 could be the processor and memory of a graphics processor (GPU) on a graphics card, a digital signal processor (DSP), a field programmable gate array (FPGA), or an ASIC.

The program 516 may be generated (e.g., compiled) and used on the same computer or it may be complied on one computer and distributed to other machines. The program 516 can be distributed (e.g., sold commercially) in any number of ways. For example, the program 516 can be distributed via a removable medium 518 such as an optical disc (e.g., DVD) or transmitted (e.g., as an installable package over the Internet) from memory of one machine to another. The program 516 could be loaded on a machine (e.g., a printer, a personal computer), which would be distributed, or it could be programmed directly into the machine. The program 516 could be a standalone program or part of a larger program (e.g., a video editing program).

Images processed according to the present invention can be distributed in any number of ways. For example, processed images 520 can be distributed via a removable medium 522 such as an optical disc (e.g., DVD), or transmitted (e.g., over the Internet) from memory of one machine to memory of another machine.

Although specific embodiments of the present invention have been described and illustrated, the present invention is not limited to the specific forms or arrangements of parts so described and illustrated. Instead, the present invention is construed according to the following claims.

The invention claimed is:

1. A method of enhancing a digital image, the method comprising:
   determining successive sets of one-dimensional transform coefficients by successively employing a one-dimensional transform on successive portions of the digital image;
   deriving successive two-dimensional transform coefficients from transforms of different respective sets of the determined successive sets of one-dimensional transform coefficients;
   modifying the two-dimensional transform coefficients;
   ascertaining successive sets of one-dimensional transform coefficients by successively employing a one-dimensional inverse transform on the modified two-dimensional transform coefficients;
   sequentially combining respective ones of the ascertained sets of one-dimensional transform coefficients to determine statistical representations; and
   successively applying a one-dimensional inverse transform on the statistical representations to produce an output image;
   wherein the determining, the deriving, the modifying, the ascertaining, the combining and the applying are performed by a processor.

2. The method of claim 1, wherein the one-dimensional transform is a one-dimensional discrete cosine transform, and the one-dimensional inverse transform is a one-dimensional inverse discrete cosine transform.

3. The method of claim 1, wherein the modifying comprises thresholding the two-dimensional transform coefficients.

4. The method of claim 1, wherein the deriving comprises deriving respective ones of the one-dimensional transform coefficients in the deriving of the successive two-dimensional transform coefficients.

5. The method of claim 4, wherein the determining and the deriving comprise:
   saving a group of pixels to a first buffer;
   performing a one-dimensional transform in a first direction on the pixel group and replacing the pixels with 1-D transform coefficients;
   performing a one-dimensional transform in a second direction on coefficients in the first buffer and saving the resulting two-dimensional coefficients to a second buffer; and
   shifting the first buffer.

6. The method of claim 5, wherein buffer size is independent of image size.

7. The method of claim 1, wherein the combining comprises re-using respective ones of the ascertained sets of one-dimensional transform coefficients.

8. The method of claim 7, wherein the combining comprises re-using respective ones of the ascertained sets of one-dimensional transform coefficients to produce statistically representative pixel values.

9. The method of claim 7, wherein the ascertaining comprises:
   performing one-dimensional inverse transforms in a first direction the modified two-dimensional transform coefficients to produce the one-dimensional transform coefficients;
   generating statistical representations of the one-dimensional transform coefficients; and
   performing one-dimensional inverse transforms in a second direction on the statistical representations.

10. The method of claim 9, wherein the statistical representations are average values of the one-dimensional transform coefficients.

11. The method of claim 10, wherein the combining comprises storing the one-dimensional transform coefficients in a first buffer, normalizing the one-dimensional transform coefficients in the first buffer, and adding the normalized one-dimensional transform coefficients to contents of a second buffer; wherein the performing of the one-dimensional inverse transforms in the second direction comprises performing the one-dimensional inverse transforms in the second direction on a first column of the added coefficients in the second buffer to produce pixel values, and shifting the second buffer so the pixel values are shifted off, and a last column is initialized.

12. The method of claim 7, wherein buffer size is independent of image size.

13. The method of claim 1, wherein the determining, the deriving, the modifying, the ascertaining, the combining, and the applying are performed image block-by-image block, where each image block is a respective portion of the digital image that is smaller than the digital image.

14. Apparatus, comprising:
   a computer-readable medium storing computer-readable instructions; and
   a computer processor coupled to the computer-readable medium, operable to execute the instructions, and based at least in part on the execution of the instructions operable to perform operations comprising determining successive sets of one-dimensional transform coefficients by successively employing a one-dimensional transform on successive portions of the digital image;

deriving successive two-dimensional transform coefficients from transforms of different respective sets of the determined successive sets of one-dimensional transform coefficients;

modifying the two-dimensional transform coefficients;

ascertaining successive sets of one-dimensional transform coefficients by successively employing a one-dimensional inverse transform on the modified two-dimensional transform coefficients;

sequentially combining respective ones of the ascertained sets of one-dimensional transform coefficients to determine statistical representations; and successively applying a one-dimensional inverse transform on the statistical representations to produce an output image.

15. A non-transitory computer-readable medium storing computer-readable instructions that, when executed by a processor, cause the processor to perform operations comprising:

determining successive sets of one-dimensional transform coefficients by successively employing a one-dimensional transform on successive portions of the digital image;

deriving successive two-dimensional transform coefficients from transforms of different respective sets of the determined successive sets of one-dimensional transform coefficients;

modifying the two-dimensional transform coefficients;

ascertaining successive sets of one-dimensional transform coefficients by successively employing a one-dimensional inverse transform on the modified two-dimensional transform coefficients;

sequentially combining respective ones of the ascertained sets of one-dimensional transform coefficients to determine statistical representations; and successively applying a one-dimensional inverse transform on the statistical representations to produce an output image.

16. A method of processing a digital image, the method comprising:

performing first and second separable block transforms in first and second directions on data derived from the digital image to obtain two-dimensional transform coefficients;

modifying the two-dimensional transform coefficients;

performing a first one-dimensional separable inverse block transform in the second direction on the modified two-dimensional transform coefficients to obtain one-dimensional transform coefficients;

combining respective ones of the one-dimensional transform coefficients to determine statistical representations; and applying a second one-dimensional separable inverse block transform in the first direction on the statistical representations to produce an output image;

wherein the performing of the first and second separable block transforms, the modifying, the performing of the first separable inverse block transform, the combining, and the applying are performed by a processor.

17. The method of claim 16, wherein the performing of the first and second separable block transforms comprises transforming the digital image from a spatial domain representation to a frequency domain representation by the first and second block transforms; the modifying comprises modifying the frequency domain representation; and the performing of the first one-dimensional separable inverse transform comprises transforming the modified frequency domain representation back to a spatial domain representation by the first and second inverse block transforms.

18. The method of claim 17, wherein the performing of the first and second separable block transforms comprises:

saving a group of pixels in the digital image to a first buffer;

performing the first block transform in the first direction on the pixel group and replacing the pixels with one-dimensional transform coefficients;

performing the second block transform in the second direction on coefficients in the first buffer and saving the resulting two-dimensional coefficients to a second buffer; and shifting the first buffer.

19. The method of claim 17, wherein the performing of the first one-dimensional inverse transform and the applying comprise:

performing the first inverse transform in the second direction on the modified frequency domain representation to produce the one-dimensional transform coefficients;

using the one-dimensional transform coefficients to produce statistical transform coefficient representations; and performing the second inverse transform in the first direction on the statistical transform coefficient representations.

20. A method of processing a sequence of digital images, comprising:

performing first and second separable block transforms on the images in first and second directions;

performing third block transforms in a third direction on the images; performing 2-D processing on elements of the third block transforms, the 2-D processing including performing the first and second block transforms, modifying the elements, and performing first and second separable inverse block transforms in the first and second directions on the modified elements; and performing third inverse block transforms in a third direction on elements of the 2-D processing;

wherein transform coefficients are re-used while performing at least one of the transforms;

wherein the performing of the first and second separable block transforms, the performing of the third block transforms, the performing of the first and second inverse block transforms, and the performing of the third inverse block transforms are performed by a processor.

21. The method of claim 20, wherein elements of the third block transforms and third inverse block transforms are re-used.

22. The method of claim 20, wherein the sequence is a sequence of video frames; and wherein the third direction is a temporal direction.

23. The method of claim 22, wherein the sequence includes L frames; wherein 1×L separable block transforms are performed across the L frames to produce L frames of 1-D transform coefficients; wherein 2-D processing is performed on the L-frames of 1-D transform coefficients, the frames processed independently; wherein 1×L separable inverse block transforms are performed in the third direction on elements of the 2-D processing; and wherein elements of the 1×L inverse block transforms are used to produce statistical representations of pixel values.

24. The method of claim 23, wherein elements of the 1×L separable block transforms are stored in L first buffers; wherein the 2-D processing is performed on each of the L first buffers, and wherein elements of the 1×L inverse block transforms are stored in L second buffers.

25. Apparatus, comprising:
a computer-readable medium storing computer-readable instructions; and
a computer processor coupled to the computer-readable medium, operable to execute the instructions, and based at least in part on the execution of the instructions operable to perform operations comprising
performing first and second separable block transforms in first and second directions on data derived from a digital image to obtain two-dimensional transform coefficients;
modifying the two-dimensional transform coefficients;
performing a first one-dimensional separable inverse block transform in the second direction on the modified two-dimensional transform coefficients to obtain one-dimensional transform coefficients;
combining respective ones of the one-dimensional transform coefficients to determine statistical representations; and
applying a second one-dimensional separable inverse block transform in the first direction on the statistical representations to produce an output image.

26. A non-transitory computer-readable medium storing computer-readable instructions that, when executed by a processor, cause the processor to perform operations comprising:
performing first and second separable block transforms in first and second directions on data derived from a digital image to obtain two-dimensional transform coefficients;
modifying the two-dimensional transform coefficients;
performing a first separable inverse block transform in the second direction on the modified two-dimensional transform coefficients to obtain one-dimensional transform coefficients;
combining respective ones of the one-dimensional transform coefficients to determine statistical representations; and
applying a second one-dimensional separable inverse block transform in the first direction on the statistical representations to produce an output image.

27. Apparatus for enhancing at least one digital image, the apparatus comprising a processor operable to perform operations comprising:
performing first and second separable block transforms in first and second directions on data derived from a digital image to obtain two-dimensional transform coefficients;
modifying the two-dimensional transform coefficients;
performing a first one-dimensional separable inverse block transform in the second direction on the modified two-dimensional transform coefficients to obtain one-dimensional transform coefficients;
combining respective ones of the one-dimensional transform coefficients to determine statistical representations; and
applying a second one-dimensional separable inverse block transform in the first direction on the statistical representations to produce an output image.

28. The apparatus of claim 27, wherein the processor transforms each digital image from a spatial domain representation to a frequency domain representation by the first and second block transforms, modifies each frequency domain representation, and uses the first and second one-dimensional separable inverse block transforms to transform each modified frequency domain representation back to a spatial domain representation.

29. The apparatus of claim 28, wherein transforming the digital image from the spatial domain representation to the frequency domain representation includes:
saving a group of pixels in the digital image to a first buffer;
performing the first block transform in the first direction on the pixel group and replacing the pixels with one-dimensional transform coefficients;
performing the second block transform in the second direction on coefficients in the first buffer and saving the resulting two-dimensional coefficients to a second buffer; and
shifting the first buffer.

30. The apparatus of claim 28, wherein transforming the frequency domain representation to the spatial domain representation comprises:
performing the first inverse transform in the second direction on the modified frequency domain representation to produce the one-dimensional transform coefficients;
using the one-dimensional transform coefficients to produce statistical transform coefficient representations; and
performing the second inverse transform in the first direction on the statistical transform coefficient representations.

31. The apparatus of claim 27, wherein the at least one digital image is a sequence of images; and wherein the processor also performs third block transforms in a third direction on the sequence, performs 2-D processing on elements of the third block transforms, and performs third inverse block transforms in a third direction on elements of the 2-D processing.

32. The apparatus of claim 31, wherein elements of the third block transforms and third inverse block transforms are re-used.

33. The apparatus of claim 31, wherein the sequence is a sequence of video frames; and wherein the third direction is a temporal direction.

34. The apparatus of claim 33, wherein the sequence includes L frames; wherein 1×L separable block transforms are performed across the L frames to produce L frames of 1-D transform coefficients; wherein 2-D processing is performed on the L-frames of 1-D transform coefficients, the frames processed independently; wherein 1×L separable inverse block transforms are performed in the third direction on elements of the 2-D processing; and wherein elements of the 1×L inverse block transforms are used to produce statistical representations of pixel values.

35. The apparatus of claim 34, wherein elements of the 1×L separable block transforms are stored in L first buffers; wherein the 2-D processing is performed on each of the L first buffers, and wherein elements of the 1×L inverse block transforms are stored in L second buffers.

* * * * *

UNITED STATES PATENT AND TRADEMARK OFFICE
CERTIFICATE OF CORRECTION

| | | |
|---|---|---|
| PATENT NO. | : 8,081,830 B2 | Page 1 of 1 |
| APPLICATION NO. | : 11/032865 | |
| DATED | : December 20, 2011 | |
| INVENTOR(S) | : Carl Staelin | |

It is certified that error appears in the above-identified patent and that said Letters Patent is hereby corrected as shown below:

In column 2, line 9, after "least one" insert -- of --.

In column 2, line 18, after "least one" insert -- of --.

In column 2, line 30, delete "illustrate" and insert -- are illustrations --, therefor.

Signed and Sealed this
Twenty-third Day of October, 2012

David J. Kappos
*Director of the United States Patent and Trademark Office*